(12) United States Patent
Zhang et al.

(10) Patent No.: US 10,834,727 B2
(45) Date of Patent: Nov. 10, 2020

(54) METHOD AND DEVICE FOR COMMUNICATING BETWEEN USER EQUIPMENT AND CONTROL THEREOF

(71) Applicant: China Academy of Telecommunications Technology, Beijing (CN)

(72) Inventors: Huiying Zhang, Beijing (CN); Jing Liang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/319,348

(22) PCT Filed: May 24, 2017

(86) PCT No.: PCT/CN2017/085780
§ 371 (c)(1),
(2) Date: Jan. 20, 2019

(87) PCT Pub. No.: WO2018/014652
PCT Pub. Date: Jan. 25, 2018

(65) Prior Publication Data
US 2019/0281595 A1    Sep. 12, 2019

(30) Foreign Application Priority Data

Jul. 20, 2016 (CN) .......................... 2016 1 0578668

(51) Int. Cl.
*H04W 72/04* (2009.01)
*H04L 12/24* (2006.01)
*H04L 12/26* (2006.01)

(52) U.S. Cl.
CPC ....... *H04W 72/048* (2013.01); *H04L 41/0668* (2013.01); *H04L 41/0816* (2013.01); *H04L 41/0853* (2013.01); *H04L 43/0805* (2013.01)

(58) Field of Classification Search
None
See application file for complete search history.

(56) References Cited

U.S. PATENT DOCUMENTS

| 2014/0056220 A1* | 2/2014 | Poitau | H04W 76/14 370/328 |
| 2015/0131544 A1* | 5/2015 | Behravan | H04L 5/0035 370/329 |

(Continued)

FOREIGN PATENT DOCUMENTS

| CN | 104244444 A | 12/2014 |
| CN | 104380828 A | 2/2015 |

(Continued)

*Primary Examiner* — Mohammed Rachedine
(74) *Attorney, Agent, or Firm* — Kilpatrick Townsend & Stockton, LLP

(57) ABSTRACT

The present application discloses a method and a device for communicating between user equipment and control thereof, in which user equipment running on a working carrier without network coverage can obtain resource configuration information of the working carrier via a network-configured carrier. In this way communication between user equipment is achieved via the working carrier, making resource configuration more flexible. A method for communicating between user equipment provided by the present application comprises: on determining user equipment is off-network on a working carrier, determining a configured carrier; on determining the configured carrier is on-network and the configured carrier is configured with resource configuration information of the working carrier, obtaining resource configuration information of the working carrier; and communicating, according to the resource configuration informa- (Continued)

tion, between the user equipment running on the working carrier.

14 Claims, 3 Drawing Sheets

(56) References Cited

U.S. PATENT DOCUMENTS

| | | | |
|---|---|---|---|
| 2016/0088468 A1 | 3/2016 | Sharma et al. | |
| 2016/0183219 A1 | 6/2016 | Kim et al. | |
| 2017/0295562 A1* | 10/2017 | Jung | H04W 48/10 |
| 2017/0366995 A1* | 12/2017 | Jung | H04W 72/0426 |
| 2018/0020339 A1* | 1/2018 | Agiwal | H04W 12/08 |
| 2018/0234938 A1* | 8/2018 | Chae | G01S 5/0252 |
| 2018/0270098 A1* | 9/2018 | Lee | H04W 72/0453 |

FOREIGN PATENT DOCUMENTS

| | | |
|---|---|---|
| CN | 104754740 A | 7/2015 |
| CN | 104768206 A | 7/2015 |
| CN | 104796849 A | 7/2015 |
| CN | 104869526 A | 8/2015 |
| CN | 104936187 A | 9/2015 |
| EP | 3091803 A1 | 11/2016 |
| JP | 2015505207 A | 2/2015 |
| JP | 2015126393 A | 7/2015 |
| JP | 2016502818 A | 1/2016 |
| JP | 2016503636 A | 2/2016 |
| JP | 2016509426 A | 3/2016 |
| WO | 2012043796 A1 | 4/2012 |
| WO | 2015139349 A1 | 9/2015 |
| WO | 2016013538 A1 | 1/2016 |
| WO | 2016045094 A1 | 3/2016 |

\* cited by examiner

METHOD AND DEVICE FOR COMMUNICATING BETWEEN USER EQUIPMENT AND CONTROL THEREOF

This application is a National Stage of International Application No. PCT/CN2017/085780, filed May 24, 2017, which claims priority to Chinese Patent Application No. 201610578668.3, filed with the Chinese Patent Office on Jul. 20, 2016, and entitled "Method and apparatus for communication between user equipments, and method and apparatus for controlling communication between user equipments", the content of which is hereby incorporated by reference in its entirety.

FIELD

The present invention relates to the field of communications, and particularly to a method and apparatus for communication between user equipments, and a method and apparatus for controlling communication between user equipments.

BACKGROUND

In the research on and design of Device to Device (D2D) communication in a Long Term Evolution (LTE) system, in order to decide that the User Equipment (UE) transmitting data via a PC5 interface is in coverage or out of coverage, whether the UE is in coverage or out of coverage on a carrier/frequency is determined based upon whether the UE can detect a cell satisfying the S criterion on the carrier/frequency. The PC5 interface is a direct UE to UE communication interface introduced to the D2D project in the 3rd Generation Partnership Project (3GPP) Release 12 (Rel-12). Adjacent UEs can transmit data on a direct link in a short-distance range without forwarding the data through any central node (e.g., a base station), and without transmitting any information between the UEs on any traditional cellular link. If the UE determines that it is out of coverage, then it may transmit data on a preconfigured resource; otherwise, it may determine that it is in coverage, so it can not communicate any data on the preconfigured resource, but will communicate data on a network-configured resource.

Vehicle to Everything (V2X) communication has been introduced to the LTE Release 14 (Rel-14), and V2X communication can be categorized into V2X communication based upon the PC5 interface (PC5-based V2X), and V2X communication based upon a Uu interface (Uu-based V2X). The PC5-based V2X communication generally operates in a high frequency band (around 5.9 GHz), and it is difficult to deploy a macro base station in the high frequency band due to the characteristic of the frequency band, so there may be no network on an operating carrier/frequency of PC5-based V2X communication; and if the UE determines that it is out of coverage, under the existing in coverage-out of coverage decision and resource access rule with the PC5 interface, and performs V2X communication on a preconfigured resource, then some drawback may exist, and for example, a preconfigured pool of resources may not be modified so that the configuration of the pool of resources may not be updated according to a services characteristic in a region.

Here V2X communication is a hot issue at present in the field of communications, and its project has been set up in the 3GPP RAN Session #67 in 2015. V2X communication generally relates to the following three aspects.

Vehicle to Vehicle (V2X) communication: communication between On Board Units (OBUs) on vehicles.

Vehicle to Infrastructure (V2I) communication: communication between a vehicle and a Road Side Unit (RSU).

Vehicle to Pedestrian (V2P) communication: communication between a vehicle and a pedestrian.

Among the three V2X communication modes above, a delay in V2V communication is required to be the shortest. Specifically an end to end delay is required not to exceed 100 ms.

In summary, PC5-based V2X communication and other future services possibly operating on a PC5 interface based carrier/frequency for which no base station is deployed can only operate on a preconfigured resource under the existing in coverage or out of coverage decision and resource access rule with the PC5 interface, but the preconfigured resource can not be updated, thus making it inflexibility.

SUMMARY

Embodiments of the invention provide a method and apparatus for communication between user equipments, and a method and apparatus for controlling communication between user equipments so as to enable a user equipment, which is out of coverage on an operating carrier/frequency, to obtain resource configuration information of the operating carrier/frequency through a configuration carrier/frequency on which the UE is in coverage, and to further communicate with another user equipment on the operating carrier/frequency, thus making a resource configured more flexibly.

An embodiment of the invention provides a method for communication between user equipments, including:

determining a configuration carrier/frequency upon determining that a user equipment is out of coverage on an operating carrier/frequency;

upon determining that the user equipment is in coverage on a configuration carrier/frequency and resource configuration information of the operating carrier/frequency is configured on the configuration carrier/frequency, obtaining the resource configuration information of the operating carrier/frequency; and communicating between the user equipment and another user equipment on the operating carrier/frequency according to the resource configuration information.

In this method, when it is determined that the UE is out of coverage on the operating carrier/frequency, the configuration carrier/frequency is determined, and when it is determined that the UE is in coverage on the configuration carrier/frequency and the resource configuration information of the operating carrier/frequency is configured on the configuration carrier/frequency, the resource configuration information of the operating carrier/frequency is obtained, and the user equipment communicates with the other user equipment on the operating carrier/frequency according to the resource configuration information. Thus the user equipment, which is out of coverage on the operating carrier/frequency, can obtain the resource configuration information of the operating carrier/frequency through the configuration carrier/frequency on which the user equipment is in coverage, and thus communicate with the other user equipment on the operating carrier/frequency. In this way, a resource can be configured more flexibly, and the resource configuration can be updated at any time.

Preferably the method further includes: communicating between the user equipment and another user equipment on a pre-configured resource upon determining that the user equipment is out of coverage on the configuration carrier/frequency.

Preferably the configuration carrier/frequency is determined in at least one of the following ways:

the configuration carrier/frequency is determined from a list of configuration carriers/frequencies in pre-configuration information;

a search carrier/frequency is determined from a list of search carriers/frequencies in pre-configuration information, and the configuration carrier/frequency is determined by a base station operating on the search carrier/frequency;

the configuration carrier/frequency is determined by interaction with a server; or the configuration carrier/frequency is determined by accessing a network on any carrier/frequency and interaction with a base station.

Preferably obtaining the resource configuration information of the operating carrier/frequency includes:

obtaining the resource configuration information of the operating carrier/frequency via a broadcast message or dedicated signaling transmitted by a base station operating on the configuration carrier/frequency.

Preferably the operating carrier/frequency includes a plurality of carriers/frequencies, the configuration carrier/frequency includes a plurality of carriers/frequencies, and one configuration carrier/frequency is configured with resource configuration information of one operating carrier/frequency, or one configuration carrier/frequency is configured with resource configuration information of a plurality of operating carrier/frequencies.

An embodiment of the invention provides a method for controlling communication between user equipments, including:

determining resource configuration information of an operating carrier/frequency for communication between user equipments; and notifying the user equipments of the resource configuration information.

Preferably the user equipments are notified of the resource configuration information via a broadcast message or dedicated signaling; or the user equipments are notified of the resource configuration information of the operating carrier/frequency while interacting with the user equipments.

An embodiment of the invention provides an apparatus for communication between user equipments, including:

a first unit configured to determine a configuration carrier/frequency upon determining that a user equipment is out of coverage on an operating carrier/frequency;

a second unit configured, upon determining that the user equipment is in coverage on a configuration carrier/frequency and resource configuration information of the operating carrier/frequency is configured on the configuration carrier/frequency, to obtain the resource configuration information of the operating carrier/frequency; and a third unit configured to communicate between the user equipment and another user equipment on the operating carrier/frequency according to the resource configuration information.

Preferably the third unit is further configured to communicate between the user equipment and another user equipment on a pre-configured resource upon determining that the user equipment is out of coverage on the configuration carrier/frequency.

Preferably the first unit determines the configuration carrier/frequency in at least one of the following ways:

the configuration carrier/frequency is determined from a list of configuration carriers/frequencies in pre-configuration information;

a search carrier/frequency is determined from a list of search carriers/frequencies in pre-configuration information, and the configuration carrier/frequency is determined by a base station operating on the search carrier/frequency;

the configuration carrier/frequency is determined by interaction with a server; or the configuration carrier/frequency is determined by accessing a network on any carrier/frequency and interaction with a base station.

Preferably the second unit configured to obtain the resource configuration information of the operating carrier/frequency is configured:

to obtain the resource configuration information of the operating carrier/frequency via a broadcast message or dedicated signaling transmitted by a base station operating on the configuration carrier/frequency.

Preferably the operating carrier/frequency includes a plurality of carriers/frequencies, the configuration carrier/frequency includes a plurality of carriers/frequencies, and one configuration carrier/frequency is configured with resource configuration information of one operating carrier/frequency, or one configuration carrier/frequency is configured with resource configuration information of a plurality of operating carriers/frequencies.

An embodiment of the invention provides an apparatus for controlling communication between user equipments, the apparatus including:

a determining unit configured to determine resource configuration information of an operating carrier/frequency for communication between user equipments; and a notifying unit configured to notify the user equipments of the resource configuration information.

Preferably the notifying unit notifies the user equipments of the resource configuration information via a broadcast message or dedicated signaling; or notifies the user equipments of the resource configuration information of the operating carrier/frequency while interacting with the user equipments.

BRIEF DESCRIPTION OF THE DRAWINGS

In order to make the technical solutions according to the embodiments of the invention more apparent, the drawings to which reference is to be made in the description of the embodiments will be introduced below in brief, and apparently the drawings to be described below illustrate only some embodiments of the invention, and based upon the drawings here, other drawings will occur to those ordinarily skilled in the art without any inventive effort.

DETAILED DESCRIPTION

Figure 1:
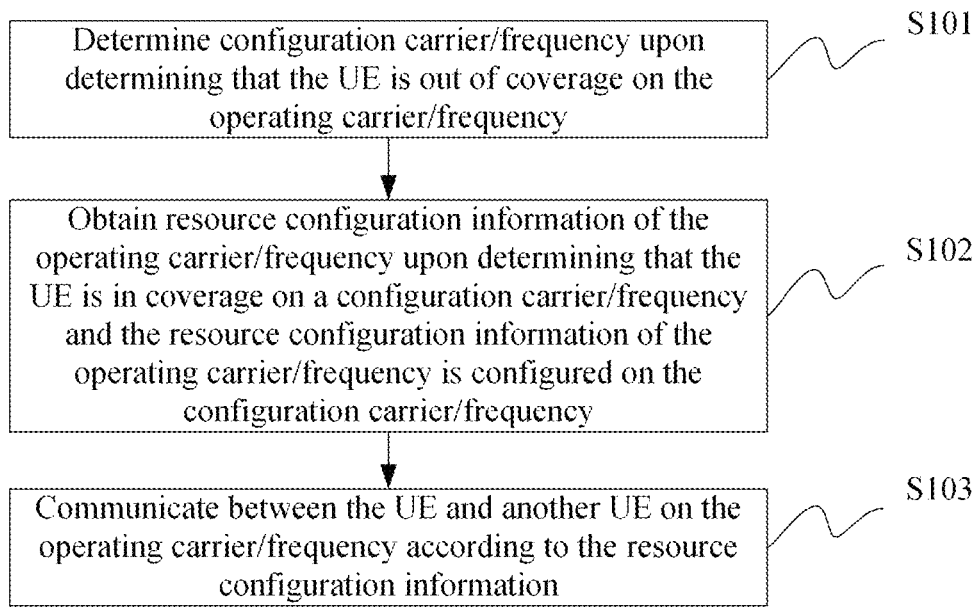
FIG. 1 is a schematic flow chart of a method for communication between user equipments according to an embodiment of the invention.

In order to make the objects, technical solutions, and advantages of the invention more apparent, the technical solutions according to the embodiments of the invention will be described below in further details with reference to the drawings in the embodiments of the invention, and apparently the embodiments to be described are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system, etc.

It shall be further appreciated in the embodiments of the invention, a User Equipment (UE) includes but will not be limited to a Mobile Station (MS), a mobile terminal, a mobile telephone, a handset, a portable equipment, etc., and the user equipment can communicate with one or more core networks on a Radio Access Network (RAN). For example, the user equipment can be a mobile telephone (referred to as a "cellular" telephone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a radio terminal on one or more sectors via an air interface. The base station can be configured to convert a received packet into an IP packet, and a received IP packet into an air frame, and operate as a router between the radio terminal and the remaining components of the access network, where the remaining components of the access network can include an Internet Protocol (IP) network. The base station can further coordinate attribute management on the air interface, and for example, the base station can be a Base Transceiver Station (BTS) in a GSM or CDMA system, or can be a Node B in a WCDMA system, or can be an evolved base station (Node B or eNB or e-Node B) in an LTE system, although the invention will not be limited thereto.

The embodiments of the invention provide a method and apparatus for communication between user equipments, and a method and apparatus for controlling communication between user equipments so as to enable a user equipment, which is out of coverage on an operating carrier/frequency (hereinafter in the invention, the frequency also refers to the carrier), to obtain resource configuration information of the operating carrier/frequency through a configuration carrier/frequency on which the UE is in coverage, and to further communicate with another user equipment on the operating carrier/frequency, thus making a resource configured more flexibly.

A configuration carrier/frequency is introduced to the technical solutions according to the embodiments of the invention, for a UE determined to be out of coverage on an operating carrier/frequency of a PC5 interface, a configuration carrier/frequency shall be further detected whether the UE is in coverage on the configuration carrier/frequency, and when the UE is also determined to be out of coverage on the configuration carrier/frequency, or the UE is determined to be in coverage on the configuration carrier/frequency, but a base station operating on the configuration carrier/frequency is not provided with any resource configuration information of the operating carrier/frequency of the PC5 interface, the UE is determined to be out of coverage, and the UE can access a preconfigured resource; otherwise, the UE accesses the resource configuration information of the operating carrier/frequency notified by the base station operating on the configuration carrier/frequency, and communicates with another UE on the operating carrier/frequency according to the resource configuration information.

Referring to FIG. 1, a method for communication between user equipments at the UE side according to an embodiment of the invention includes the following steps.

The step S101 is to determine a configuration carrier/frequency upon determining that a user equipment is out of coverage on an operating carrier/frequency.

The step S102 is to obtain resource configuration information of the operating carrier/frequency upon determining that the user equipment is in coverage on a configuration carrier/frequency and the resource configuration information of the operating carrier/frequency is configured on the configuration carrier/frequency.

Stated otherwise, in the embodiment of the invention, the user equipment is in coverage on the configuration carrier/frequency in the following two instances: one instance is that: the resource configuration information of the operating carrier/frequency is configured on the configuration carrier/frequency, and in this instance, the user equipment can communicate with another user equipment on the operating carrier/frequency according to the resource configuration information of the operating carrier/frequency configured on the configuration carrier/frequency; and another instance is that: the resource configuration information of the operating carrier/frequency is not configured on the configuration carrier/frequency, and in this instance, the user equipment still shall communicate with the other user equipment on the operating carrier/frequency on a preconfigured resource.

The step S103 is to communicate between the user equipment and another user equipment on the operating carrier/frequency according to the resource configuration information.

In this method, when it is determined that the user equipment is out of coverage on the operating carrier/frequency, the configuration carrier/frequency is determined, and when it is determined that the user equipment is in coverage on the configuration carrier/frequency and the resource configuration information of the operating carrier/frequency is configured on the configuration carrier/frequency, the resource configuration information of the operating carrier/frequency is obtained, and the user equipment communicates with the other user equipment on the operating carrier/frequency according to the resource configuration information, so that the user equipment operating on the operating carrier/frequency which is not covered with any network can obtain the resource configuration information of the operating carrier/frequency through the configuration carrier/frequency on which the user equipment is in coverage, and thus communicate with the other user equipment on the operating carrier/frequency. In this way, a resource can be configured more flexibly, and the resource configuration can be updated at any time.

Preferably the method further includes: communicating between the user equipment and another user equipment on a preconfigured resource upon determining that the user equipment is out of coverage on the configuration carrier/frequency.

Preferably the configuration carrier/frequency is determined in at least one of the following ways.

The configuration carrier/frequency is determined from a list of configuration carriers/frequencies in pre-configuration information.

A search carrier/frequency is determined from a list of search carriers/frequencies in pre-configuration information, and the configuration carrier/frequency is determined by a base station operating on the search carrier/frequency.

The configuration carrier/frequency is determined by interaction with a server, where the user equipment can obtain information about the configuration carrier/frequency from the server in any way, and for example, the user equipment can obtain the information about the configuration carrier/frequency from the server through a wired connection, WIFI, a 2G 3G 4G or 5G network interface connection, etc., and determine the configuration carrier/frequency.

The UE accesses a network on any carrier/frequency, and the configuration carrier/frequency is determined by interaction with a base station.

Preferably obtaining the resource configuration information of the operating carrier/frequency includes: obtaining the resource configuration information of the operating carrier/frequency via a broadcast message or dedicated signaling transmitted by a base station operating on the configuration carrier/frequency.

Preferably the operating carrier/frequency includes a plurality of carriers/frequencies, the configuration carrier/frequency includes a plurality of carriers/frequencies, and one configuration carrier/frequency is configured with resource configuration information of one operating carrier/frequency, or one configuration carrier/frequency is configured with resource configuration information of a plurality of operating carriers/frequencies.

Preferably the operating carrier/frequency as referred to in the embodiment of the invention is an operating carrier/frequency of a PC5 interface. Of course, the embodiment of the invention can also be applicable to another type of operating carrier/frequency than this, that is, the technical solution according to the embodiment of the invention can be applicable to communication between user equipments in any scenario, e.g., Bluetooth, infrared, WiFi, etc. The operating carrier/frequency of the PC5 interface can be a plurality of carriers/frequencies, and the configuration carrier/frequency can also be a plurality of carriers/frequencies. For a plurality of operating carriers/frequencies, the network can configure resources of all the operating carriers/frequencies through a configuration carrier/frequency, or can configure resources of a part of the operating carriers/frequencies through a configuration carrier/frequency, or can configure resources of different operating carriers/frequencies through different configuration carriers/frequencies.

Figure 2:
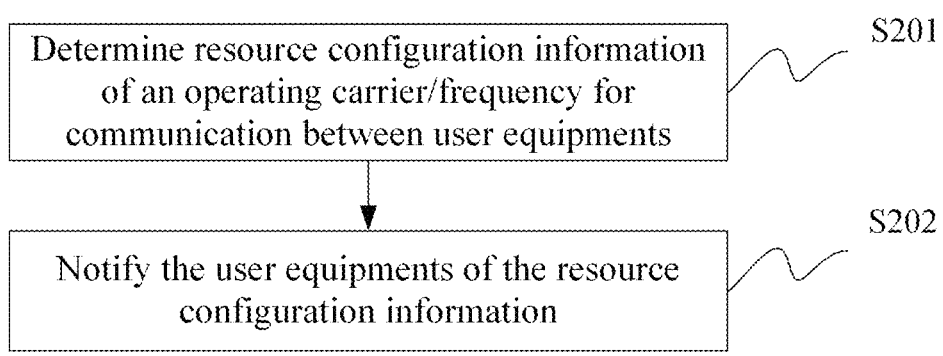
FIG. 2 is a schematic flow chart of a method for controlling communication between user equipments according to an embodiment of the invention.

Correspondingly referring to FIG. 2, a method for controlling communication between user equipments at the base station side according to an embodiment of the invention includes the following steps.

The step S201 is to determine resource configuration information of an operating carrier/frequency for communication between user equipments.

The step S202 is to notify the user equipments of the resource configuration information.

Preferably a base station operating on the configuration carrier/frequency notifies the user equipments of the resource configuration information via a broadcast message or dedicated signaling; or the base station operating on the configuration carrier/frequency notifies the user equipments of the resource configuration information of the operating carrier/frequency while interacting with the user equipments.

Several specific embodiments will be introduced below, and user equipments will communicate with each other via a PC5 interface, for example, throughout the embodiments.

A first embodiment relates to a PC5 single-carrier/frequency scenario, where a UE of a PC5 interface operates on a carrier/frequency F1, no base station operates on the carrier/frequency F1, a carrier/frequency F2 is pre-configured as a configuration carrier/frequency, the carrier/frequency F2 is covered with an LTE network, and the base station broadcasts recourse configuration information of the carrier/frequency F1 via a System Information Block (SIB), so a specific communication process includes the following steps.

In the first step, the UE searches the network on the F1, but does not find any cell satisfying the S criterion as a result of the search.

In the second step, the UE searches the network on the F2, and finds a cell A satisfying the S criterion as a result of the search, and the UE reads system information of the cell A, and receives PC5 resource configuration information of the F1.

In the third step, the UE communicates on the F1 using the received PC5 resource configuration information of the F1.

A second embodiment relates to a PC5 single-carrier/frequency scenario, where a UE of a PC5 interface operates on a carrier/frequency F1, no base station operates on the carrier/frequency F1, a carrier/frequency F2 is pre-configured as a configuration carrier/frequency, and no cell satisfying the S criterion is found on the carrier/frequency F2 as a result of the search, so a specific communication process includes the following steps.

In the first step, the UE searches the network on the carrier/frequency F1, but does not find any cell satisfying the S criterion as a result of the search.

In the second step, the UE searches the network on the carrier/frequency F2, but does not find any cell satisfying the S criterion as a result of the search.

In the third step, the UE communicates on a pre-configured configuration resource on the carrier/frequency F1.

A third embodiment relates to a PC5 single-carrier/frequency scenario, where a UE of a PC5 interface operates on a carrier/frequency F1, no base station operates on the carrier/frequency F1, a carrier/frequency F2 is pre-configured as a configuration carrier/frequency, and no cell satisfying the S criterion is found on the carrier/frequency F2 as a result of the search, so a specific communication process includes the following steps.

In the first step, the UE searches the network on the carrier/frequency F1, but does not find any cell satisfying the S criterion as a result of the search.

In the second step, the UE searches the network on the carrier/frequency F2, and finds a cell A satisfying the S criterion as a result of the search, and the UE reads system information of the cell A, but does not receive any PC5 resource configuration information of the F1, or the UE is connected with a base station, interacts with the base station via dedicated signaling, and knows that there is no PC5 resource configuration information of the carrier/frequency F1.

In the third step, the UE communicates on a pre-configured configuration resource on the carrier/frequency F1.

A fourth embodiment relates to a PC5 single-carrier/frequency scenario, where a UE of a PC5 interface operates on a carrier/frequency F1, no base station operates on the carrier/frequency F1, pre-configuration information of the UE includes a search carrier/frequency F3, and a configuration carrier/frequency of the PC5 interface is a carrier/frequency F2, so a specific communication process includes the following steps.

In the first step, the UE searches the network on the carrier/frequency F1, but does not find any cell satisfying the S criterion as a result of the search.

In the second step, the UE searches the network on the carrier/frequency F3, and finds a cell A satisfying the S criterion as a result of the search, and the UE reads system information of the cell A, obtains information about the PC5 configuration carrier/frequency F2, and determines the PC5 configuration carrier/frequency F2.

In the third step, the UE searches the network on the carrier/frequency F2, and finds a cell B satisfying the S criterion as a result of the search, and the UE reads system information of the cell B, and receives PC5 resource configuration information of the carrier/frequency F1.

In the fourth step, the UE communicates on the carrier/frequency F1 using the received PC5 resource configuration information of the carrier/frequency F1.

A fifth embodiment relates to a PC5 single-carrier/frequency scenario, where a UE of a PC5 interface operates on a carrier/frequency F1, no base station operates on the carrier/frequency F1, and the UE interacts with a server on any access network and obtains a configuration carrier/frequency F2, so a specific communication process includes the following steps.

In the first step, the UE searches the network on the carrier/frequency F1, but does not find any cell satisfying the S criterion as a result of the search.

In the second step, the UE searches the network on the carrier/frequency F2, and finds a cell A satisfying the S criterion as a result of the search, and the UE reads system information of the cell A, and receives PC5 resource configuration information of the carrier/frequency F1.

In the third step, the UE communicates on the carrier/frequency F1 using the received PC5 resource configuration information of the carrier/frequency F1.

A sixth embodiment relates to a PC5 single-carrier/frequency scenario, where a UE of a PC5 interface operates on a carrier/frequency F1, no base station operates on the carrier/frequency F1, and the UE does not know any information about a configuration carrier/frequency, so a specific communication process includes the following steps.

In the first step, the UE searches the network on the carrier/frequency F1, but does not find any cell satisfying the S criterion as a result of the search.

In the second step, the UE searches the network via an Uu interface, and resides on a cell A satisfying the S criterion.

In the third step, the UE interacts with a server, and obtains information about a configuration carrier/frequency F2.

In the fourth step, the UE searches the network on the carrier/frequency F2, and finds a cell B satisfying the S criterion as a result of the search, and the UE reads system information of the cell B, and receives PC5 resource configuration information of the carrier/frequency F1.

In the fifth step, the UE communicates on the carrier/frequency F1 using the received PC5 resource configuration information of the carrier/frequency F1.

A seventh embodiment relates to a PC5 multi-carrier/frequency scenario, where a UE of a PC5 interface operates on a carrier/frequency F1 and a carrier/frequency F2, no base station operates on either of the carrier/frequency F1 and the carrier/frequency F2, and pre-configuration information of the UE includes information about a configuration carrier/frequency F3, so a specific communication process includes the following steps.

In the first step, the UE searches the network on the carrier/frequency F1 and the carrier/frequency F2, but does not find any cell satisfying the S criterion as a result of the search.

In the second step, the UE searches the network on the carrier/frequency F3, and finds a cell A satisfying the S criterion as a result of the search, and the UE reads system information of the cell A, and receives PC5 resource configuration information of the carrier/frequencies F1 and F2.

In the third step, the UE communicates on the carriers/frequencies F1 and F2 using the received PC5 resource configuration information of the carriers/frequencies F1 and F2.

An eighth embodiment relates to a PC5 multi-carrier/frequency scenario, where a UE of a PC5 interface operates on a carrier/frequency F1 and a carrier/frequency F2, no base station operates on either of the carrier/frequency F1 and the carrier/frequency F2, and pre-configuration information of the UE includes information about a configuration carrier/frequency F3, so a specific communication process includes the following steps.

In the first step, the UE searches the network on the carrier/frequency F1 and the carrier/frequency F2, but does not find any cell satisfying the S criterion as a result of the search.

In the second step, the UE searches the network on the carrier/frequency F3, and finds a cell A satisfying the S criterion as a result of the search, and the UE reads system information of the cell A, and receives PC5 resource configuration information of the carrier/frequency F1.

In the third step, the UE communicates on the carrier/frequency F1 using the received PC5 resource configuration information of the carrier/frequency F1, and the UE communicates on the carrier/frequency F2 using pre-configuration information.

A ninth embodiment relates to a PC5 multi-carrier/frequency scenario, where a UE of a PC5 interface operates on a carrier/frequency F1 and a carrier/frequency F2, no base station operates on either of the carrier/frequency F1 and the carrier/frequency F2, and pre-configuration information of the UE includes information about configuration carriers/frequencies F3 and F4, so a specific communication process includes the following steps.

In the first step, the UE searches the network on the carrier/frequency F1 and the carrier/frequency F2, but does not find any cell satisfying the S criterion as a result of the search.

In the second step, the UE searches the network on the carrier/frequency F3, and finds a cell A satisfying the S criterion as a result of the search, and the UE reads system information of the cell A, and receives PC5 resource configuration information of the carrier/frequency F1.

In the third step, the UE searches the network on the carrier/frequency F4, and finds a cell B satisfying the S criterion as a result of the search, and the UE reads system information of the cell B, and receives PC5 resource configuration information of the carrier/frequency F2.

In the fourth step, the UE communicates on the carrier/frequency F1 using the PC5 resource configuration information of the carrier/frequency F1 received on the carrier/frequency F3, and the UE communicates on the carrier/frequency F2 using the PC5 resource configuration information of the carrier/frequency F2 received on the carrier/frequency F4.

Embodiments in which the UE obtains information about a configuration carrier/frequency in another way to determine the configuration carrier/frequency in the multi-carrier/frequency scenario will not be enumerated here, and will be substantially the same as those in the single-carrier/frequency scenario.

In the embodiments above, when the UE does not detect any cell satisfying the S criterion on any of the operating carrier/frequency(s) and the configuration carrier/frequency of the PC5 interface, then the UE communicates on a pre-configured configuration resource.

Figure 3:
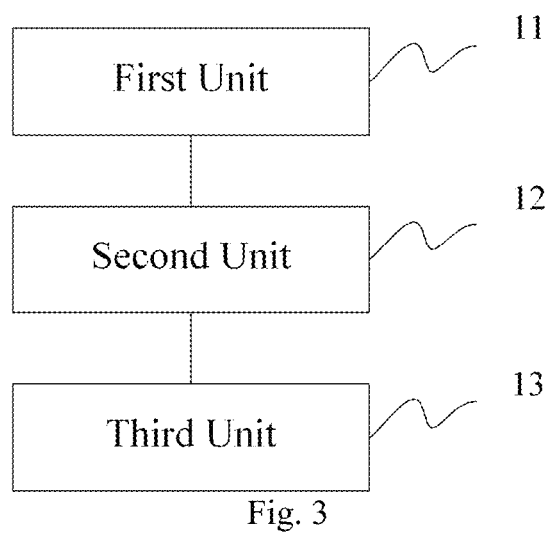
FIG. 3 is a schematic structural diagram of an apparatus for communication between user equipments according to an embodiment of the invention.

In correspondence to the method above at the user equipment side, referring to FIG. 3, an apparatus for communication between user equipments according to an embodiment of the invention includes the following units.

A first unit 11 is configured to determine a configuration carrier/frequency upon determining that a user equipment is out of coverage on an operating carrier/frequency.

A second unit 12 is configured to obtain resource configuration information of the operating carrier/frequency upon determining that the user equipment is in coverage on a configuration carrier/frequency and the resource configuration information of the operating carrier/frequency is configured on the configuration carrier/frequency.

A third unit 13 is configured to communicate between the user equipment and another user equipment on the operating carrier/frequency according to the resource configuration information.

Preferably the third unit is further configured to communicate between the user equipment and another user equipment on a pre-configured resource upon determining that the user equipment is out of coverage on the configuration carrier/frequency.

Preferably the first unit determines the configuration carrier/frequency in at least one of the following ways.

The configuration carrier/frequency is determined from a list of configuration carriers/frequencies in pre-configuration information.

A search carrier/frequency is determined from a list of search carriers/frequencies in pre-configuration information, and the configuration carrier/frequency is determined by a base station operating on the search carrier/frequency.

The configuration carrier/frequency is determined by interaction with a server.

The configuration carrier/frequency is determined by accessing a network on any carrier/frequency and interaction with a base station.

Preferably the second unit configured to obtain the resource configuration information of the operating carrier/frequency is configured: to obtain the resource configuration information of the operating carrier/frequency via a broadcast message or dedicated signaling transmitted by a base station operating on the configuration carrier/frequency.

Preferably the operating carrier/frequency includes a plurality of carriers/frequencies, the configuration carrier/frequency includes a plurality of carriers/frequencies, and one configuration carrier/frequency is configured with resource configuration information of one operating carrier/frequency, or one configuration carrier/frequency is configured with resource configuration information of a plurality of operating carriers/frequencies.

Figure 4:
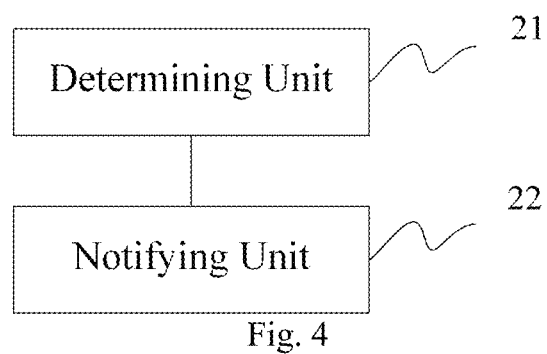
FIG. 4 is a schematic structural diagram of an apparatus for controlling communication between user equipments according to an embodiment of the invention.

In correspondence to the method above at the network side, referring to FIG. 4, an apparatus for controlling communication between user equipments according to an embodiment of the invention includes the following units.

A determining unit 21 is configured to determine resource configuration information of an operating carrier/frequency for communication between user equipments.

A notifying unit 22 is configured to notify the user equipments of the resource configuration information.

Preferably the notifying unit notifies the user equipments of the resource configuration information via a broadcast message or dedicated signaling; or notifies the user equipments of the resource configuration information of the operating carrier/frequency while interacting with the user equipments.

Figure 5:
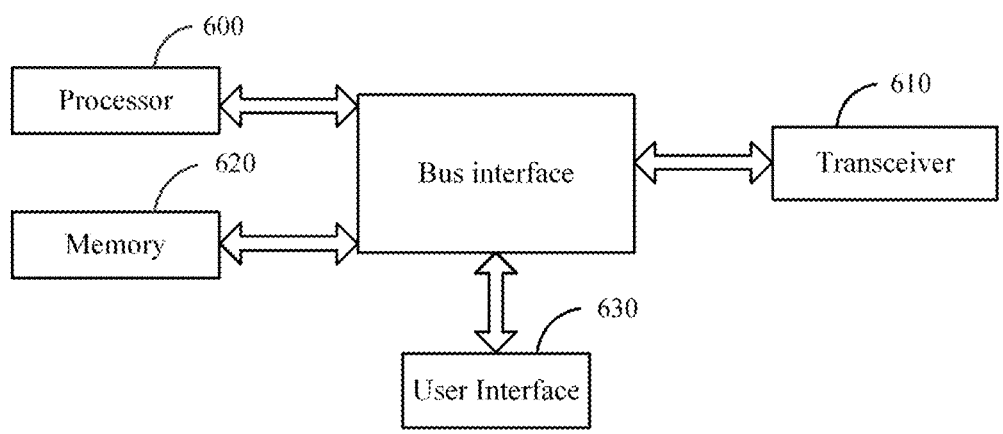
FIG. 5 is a schematic structural diagram of another apparatus for communication between user equipments according to an embodiment of the invention.

In correspondence to the method above at the user equipment side, referring to FIG. 5, another apparatus for communication between user equipments according to an embodiment of the invention includes the followings.

A processor 600 is configured to read and execute program in a memory 620: to determine a configuration carrier/frequency upon determining that a user equipment is out of coverage on an operating carrier/frequency; to obtain resource configuration information of the operating carrier/frequency through a transceiver 610 upon determining that the user equipment is in coverage on a configuration carrier/frequency and the resource configuration information of the operating carrier/frequency is configured on the configuration carrier/frequency; and to communicate between the user equipment and another user equipment on the operating carrier/frequency through the transceiver 610 according to the resource configuration information.

Preferably the processor 600 is further configured to communicate between the user equipment and another user equipment on a pre-configured resource upon determining that the user equipment is out of coverage on the configuration carrier/frequency.

Preferably the processor 600 determines the configuration carrier/frequency in at least one of the following ways.

The configuration carrier/frequency is determined from a list of configuration carriers/frequencies in pre-configuration information.

A search carrier/frequency is determined from a list of search carriers/frequencies in pre-configuration information, and the configuration carrier/frequency is determined by a base station operating on the search carrier/frequency.

The configuration carrier/frequency is determined by interaction with a server through the transceiver 610.

The configuration carrier/frequency is determined by accessing a network on any carrier/frequency and interaction with a base station through the transceiver 610.

Preferably the processor 600 configured to obtain the resource configuration information of the operating carrier/frequency is configured: to obtain the resource configuration information of the operating carrier/frequency via a broadcast message or dedicated signaling transmitted by a base station operating on the configuration carrier/frequency through the transceiver 610.

Preferably the operating carrier/frequency includes a plurality of carriers/frequencies, the configuration carrier/frequency includes a plurality of carriers/frequencies, and one configuration carrier/frequency is configured with resource configuration information of one operating carrier/frequency, or one configuration carrier/frequency is configured with resource configuration information of a plurality of operating carriers/frequencies.

The transceiver 610 is configured to receive and transmit data under the control of the processor 600.

Here in FIG. 5, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices on a transmission medium. For different user equipments, the user interface 630 can also be an interface via which devices are connected internally and externally as needed, and the connected devices include but will not be limited to a keypad, a monitor, a speaker, a microphone, a joystick, etc.

The processor 600 is responsible for managing the bus architecture and performing normal processes, and the memory 620 can store data for use by the processor 600 in performing the operations.

Figure 6:
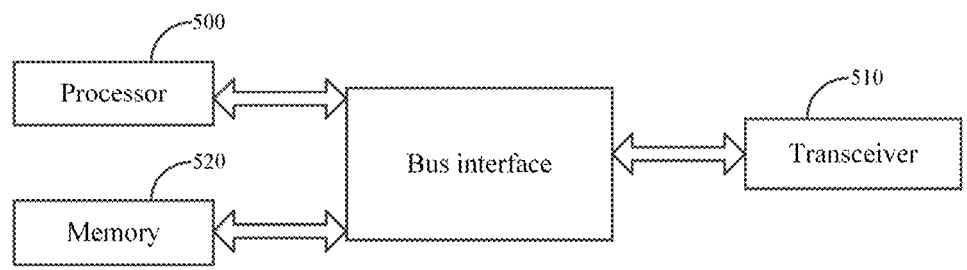
FIG. 6 is a schematic structural diagram of another apparatus for controlling communication between user equipments according to an embodiment of the invention.

In correspondence to the method above at the network side, referring to FIG. 6, another apparatus for controlling communication between user equipments according to an embodiment of the invention includes the followings.

A processor 500 is configured to read and execute program in a memory 520: to determine resource configuration information of an operating carrier/frequency for communication between user equipments; and to notify the user equipments of the resource configuration information through a transceiver 510.

Preferably the processor 500 notifies the user equipments of the resource configuration information via a broadcast message or dedicated signaling through the transceiver 510; or the processor 500 notifies the user equipments of the resource configuration information of the operating carrier/frequency while interacting with the user equipments through the transceiver 510.

The transceiver 510 is configured to receive and transmit data under the control of the processor 500.

Here in FIG. 6, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices on a transmission medium. The processor 500 is responsible for managing the bus architecture and performing normal processes, and the memory 520 can store data for use by the processor 500 in performing the operations.

An embodiment of the invention further provides a computer device including at least a memory 700 and at least one processor 710.

The memory 700 stores program configured to perform a method for communication between user equipments.

At least one processor 710 is configured to read the program, and upon executing the program, to perform the steps of: determining a configuration carrier/frequency upon determining that a user equipment is out of coverage on an operating carrier/frequency; obtaining resource configuration information of the operating carrier/frequency upon determining that the user equipment is in coverage on a configuration carrier/frequency and the resource configuration information of the operating carrier/frequency is configured on the configuration carrier/frequency; and communicating between the user equipment and another user equipment on the operating carrier/frequency according to the resource configuration information.

An embodiment of the invention further provides a computer device including at least a memory 800 and at least one processor 810.

The memory 800 stores program configured to perform a method for controlling communication between user equipments.

At least one processor 810 is configured to read the program, and upon executing the program, to perform the steps of: determining resource configuration information of an operating carrier/frequency for communication between user equipments; and notifying unit the user equipments of the resource configuration information.

The processors in the embodiments of the invention can be a Central Processing Unit (CPU), an Application-Specific Integrated Circuit (ASIC), a Field-Programmable Gate Array (FPGA), or a Complex Programmable Logic Device (CPLD).

The apparatuses for communication between user equipments according to the embodiments of the invention are user equipments, for example; and the apparatus for controlling communication between user equipments according to the embodiments of the invention can be base stations or other network devices, for example.

In summary, a configuration carrier/frequency is introduced in the embodiments of the invention, for a UE determined to be out of coverage on an operating carrier/frequency of a PC5 interface, a configuration carrier/frequency shall be further searched for, and whether the user equipment is in coverage on the configuration carrier/frequency shall be further determined, and when the UE is also determined to be out of coverage on the configuration carrier/frequency, or the UE is determined to be in coverage on the configuration carrier/frequency, but a base station operating on the configuration carrier/frequency is not provided with any resource configuration information of the operating carrier/frequency of the PC5 interface, the UE is determined to be out of coverage, and the UE can communicate on the operating carrier/frequency on a preconfigured resource; otherwise, the UE communicates on the operating carrier/frequency using the resource configuration information of the operating carrier/frequency of the PC5 interface configured by the base station operating on the configuration carrier/frequency. In this way, the network can configure a resource deployed on a PC5 interface without any base station, to thereby configure the resource more flexibly in the embodiments of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for communication between user equipments, comprising:
    determining a configuration frequency upon determining that a user equipment is out of coverage on an operating frequency, wherein the operating frequency is used for D2D communication between the user equipment and another user equipment, and the configuration frequency is used for communication between the user equipment and a base station;
    upon determining that the user equipment is in coverage on a configuration frequency and resource configuration information of the operating frequency is configured on the configuration frequency, obtaining the resource configuration information of the operating frequency configured on the configuration frequency; and
    communicating between the user equipment and another user equipment on the operating frequency according to the resource configuration information of the operating frequency;
    wherein the configuration frequency is determined in at least one of the following ways:
    the configuration frequency is determined from a list of configuration frequencies in pre-configuration information;
    a search frequency is determined from a list of search frequencies in pre-configuration information, and the configuration frequency is determined by a base station operating on the search frequency;
    the configuration frequency is determined by interaction with a server; or
    the configuration frequency is determined by accessing a network on any frequency and interaction with a base station.

2. The method according to claim 1, further comprises: communicating between the user equipment and another user equipment on a pre-configured resource upon determining that the user equipment is out of coverage on the configuration frequency.

3. The method according to claim 1, wherein obtaining the resource configuration information of the operating frequency configured on the configuration frequency comprises:
    obtaining the resource configuration information of the operating frequency configured on the configuration frequency via a broadcast message or dedicated signaling transmitted by a base station operating on the configuration frequency.

4. The method according to claim 1, wherein the operating frequency comprises a plurality of frequencies, the configuration frequency comprises a plurality of frequencies, and one configuration frequency is configured with resource configuration information of one operating frequency, or one configuration frequency is configured with resource configuration information of a plurality of operating frequencies.

5. A non-transitory computer readable storage medium storing executable instructions that, when executed by an electronic device, cause the electronic device to perform the method according to claim 1.

6. A method for controlling communication between user equipments, applied to a base station operating on a configuration frequency, wherein the resource configuration information of an operating frequency is configured on the configuration frequency, wherein the operating frequency is used for D2D communication between the user equipment and another user equipment, the configuration frequency is used for communication between the user equipment and the base station, and the method comprising:
    determining resource configuration information of the operating frequency for communication between user equipments; and
    notifying, through the configuration frequency, the user equipments of the resource configuration information of the operating frequency, so that the user equipments perform communication between the user equipments on the operating frequency according to the resource configuration information of the operating frequency;
    wherein the configuration frequency is determined in at least one of the following ways:
    the configuration frequency is determined from a list of configuration frequencies in pre-configuration information;

a search frequency is determined from a list of search frequencies in pre-configuration information, and the configuration frequency is determined by a base station operating on the search frequency;

the configuration frequency is determined by interaction with a server; or the configuration frequency is determined by accessing a network on any frequency and interaction with a base station.

7. A non-transitory computer readable storage medium storing executable instructions that, when executed by an electronic device, cause the electronic device to perform the method according to claim 6.

8. The method according to claim 6, wherein the user equipments are notified of the resource configuration information by the base station operating on the configuration frequency via a broadcast message or dedicated signaling; or the user equipments are notified of the resource configuration information of the operating frequency by the base station operating on the configuration frequency while interacting with the user equipments.

9. An apparatus for communication between user equipments, comprising:

a memory configured to store program, and at least one processor configured to execute the program:

to determine a configuration frequency upon determining that a user equipment is out of coverage on an operating frequency, wherein the operating frequency is used for D2D communication between the user equipment and another user equipment, and the configuration frequency is used for communication between the user equipment and a base station;

upon determining that the user equipment is in coverage on a configuration frequency and resource configuration information of the operating frequency is configured on the configuration frequency, to obtain the resource configuration information of the operating frequency configured on the configuration frequency; and to communicate between the user equipment and another user equipment on the operating frequency according to the resource configuration information of the operating frequency;

wherein the at least one processor determines the configuration frequency in at least one of the following ways:

the configuration frequency is determined from a list of configuration frequencies in pre-configuration information;

a search frequency is determined from a list of search frequencies in pre-configuration information, and the configuration frequency is determined by a base station operating on the search frequency;

the configuration frequency is determined by interaction with a server; or the configuration frequency is determined by accessing a network on any frequency and interaction with a base station.

10. The apparatus according to claim 9, wherein the at least one processor is further configured to communicate between the user equipment and another user equipment on a pre-configured resource upon determining that the user equipment is out of coverage on the configuration frequency.

11. The apparatus according to claim 9, wherein the at least one processor configured to obtain the resource configuration information of the operating frequency configured on the configuration frequency is configured:

to obtain the resource configuration information of the operating frequency configured on the configuration frequency via a broadcast message or dedicated signaling transmitted by a base station operating on the configuration frequency.

12. The apparatus according to claim 9, wherein the operating frequency comprises a plurality of frequencies, the configuration frequency comprises a plurality of frequencies, and one configuration frequency is configured with resource configuration information of one operating frequency, or one configuration frequency is configured with resource configuration information of a plurality of operating frequencies.

13. An apparatus for controlling communication between user equipments, applied to a base station operating on a configuration frequency, wherein the resource configuration information of an operating frequency is configured on the configuration frequency, wherein the operating frequency is used for D2D communication between the user equipment and another user equipment, the configuration frequency is used for communication between the user equipment and the base station, and the apparatus comprising:

a memory configured to store program, and at least one processor configured to execute the program:

to determine resource configuration information of the operating frequency for communication between user equipments; and to notify, through the configuration frequency, the user equipments of the resource configuration information of the operating frequency, so that the user equipments perform communication between the user equipments on the operating frequency according to the resource configuration information of the operating frequency;

wherein the configuration frequency is determined in at least one of the following ways:

the configuration frequency is determined from a list of configuration frequencies in pre-configuration information;

a search frequency is determined from a list of search frequencies in pre-configuration information, and the configuration frequency is determined by a base station operating on the search frequency;

the configuration frequency is determined by interaction with a server; or the configuration frequency is determined by accessing a network on any frequency and interaction with a base station.

14. The apparatus according to claim 13, wherein the at least one processor notifies the user equipments of the resource configuration information via a broadcast message or dedicated signaling; or notifies the user equipments of the resource configuration information of the operating frequency while interacting with the user equipments.

* * * * *